United States Patent
DiGregorio et al.

(10) Patent No.: US 10,790,572 B1
(45) Date of Patent: Sep. 29, 2020

(54) DEVICES, SYSTEMS, AND METHODS ASSOCIATED WITH RFID TAG READER ASSEMBLIES FOR USE IN BARCODE READERS

(71) Applicant: ZEBRA TECHNOLOGIES CORPORATION, Lincolnshire, IL (US)

(72) Inventors: Joseph F. DiGregorio, Seaford, NY (US); Joseph J. DiVirgilio, Port Jefferson Station, NY (US); Eric Trongone, West Babylon, NY (US); Amit Asthana, Germantown, MD (US); Peter Sie Jeng Heng, Ipoh (MY); Theodore S. Hebron, Lincoln, NE (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/425,509

(22) Filed: May 29, 2019

(51) Int. Cl.
| | |
|---|---|
| *H01Q 1/22* | (2006.01) |
| *H01Q 9/40* | (2006.01) |
| *G06K 7/14* | (2006.01) |
| *G06K 7/00* | (2006.01) |
| *G06K 7/10* | (2006.01) |
| *H01Q 9/16* | (2006.01) |

(52) U.S. Cl.
CPC .......... *H01Q 1/2208* (2013.01); *G06K 7/0004* (2013.01); *G06K 7/10346* (2013.01); *G06K 7/1413* (2013.01); *H01Q 9/16* (2013.01); *H01Q 9/40* (2013.01)

(58) Field of Classification Search
None
See application file for complete search history.

(56) References Cited

U.S. PATENT DOCUMENTS

| | | | |
|---|---|---|---|
| 8,919,648 B2 * | 12/2014 | Man | G06K 7/0004 235/435 |
| 2006/0138232 A1 * | 6/2006 | Hammerslag | G06K 7/10881 235/440 |
| 2009/0039162 A1 * | 2/2009 | Yen | G06K 7/0004 235/462.11 |
| 2009/0289116 A1 * | 11/2009 | Copeland | G06K 7/10316 235/440 |
| 2011/0121075 A1 * | 5/2011 | Bellows | G06K 7/1098 235/440 |
| 2020/0042752 A1 * | 2/2020 | Tourdot | G06K 7/1097 |

* cited by examiner

*Primary Examiner* — Kristy A Haupt
(74) *Attorney, Agent, or Firm* — Yuri Astvatsaturov

(57) ABSTRACT

In an embodiment, the present invention is a barcode and RFID tag reader that includes a head portion housing an imaging assembly, the imaging assembly configured to capture images of an environment appearing with a FOV extending through a window; a base portion housing an RFID tag reader assembly; and an intermediate portion extending between the head portion and the base portion. Preferably, the RFID tag reader assembly includes a chassis having a face directed towards the FOV and an antenna assembly at least partially contoured around the face of the chassis where the antenna assembly includes: a monopole flexible antenna having a first monopole antenna element having a first half and a second half, the first half and the second half being substantially symmetrical about a line of symmetry; and a dipole flexible antenna extending at least partially over at least a portion of the first monopole antenna element.

23 Claims, 6 Drawing Sheets

DEVICES, SYSTEMS, AND METHODS ASSOCIATED WITH RFID TAG READER ASSEMBLIES FOR USE IN BARCODE READERS

FIELD OF INVENTION

At least some embodiments of the present invention generally relate to the field of RFID tag reader assemblies, and more specifically, to RFID tag reader assemblies for use in bar code readers often used in venues such as retail stores.

BACKGROUND

Today, in venues like, for example, retail stores, it is common to attach labels with barcodes and/or radio frequency (RF) identification (RFID) tags (collectively referred to as "article identification means") to articles to help track and identify these articles during regular course of business. One place in particular where these labels and tags are relied on is the checkout counter where users (e.g., a cashier or a customer in case of a self-checkout arrangement) present articles, along with the article identification means, to a barcode reader and/or an RFID tag reader to signal to a point of sale (POS) checkout station that they wish to purchase those articles.

With respect to reading barcodes, having visual references such as a barcode reader window, aiming lights, and a visible barcode, make it easier for a user to properly orient the barcode label for proper data capture. However, capturing data associated with RFID tags may be more difficult since the position of RFID tags is often not readily apparent to users and neither is the field of radiated RF energy.

As such, there exists a need for continued improvements in cost-effective designs of RFID reader assemblies, and in particular, RFID reader assemblies for use with barcode readers, which help capture RFID tag data more consistently when RFID tags are brought within a predefined scanning region.

SUMMARY

Accordingly, at least some embodiments of the present invention are directed towards cost-effective designs of RFID reader assemblies.

In an embodiment, the present invention is a barcode and RFID tag reader comprising: a head portion housing an imaging assembly, the imaging assembly configured to capture images of an environment appearing with a field of view (FOV) extending through a window; a base portion housing an RFID tag reader assembly; and an intermediate portion extending between the head portion and the base portion, wherein the RFID tag reader assembly includes a chassis having a face directed towards the FOV and an antenna assembly at least partially contoured around the face of the chassis, and wherein the antenna assembly includes: a monopole flexible antenna having a first monopole antenna element positioned near a top portion of the face of the chassis and a second monopole antenna element positioned near a bottom portion of the face of the chassis; and a dipole flexible antenna extending at least partially over at least a portion of the first monopole antenna element.

In another embodiment the present invention is a barcode and radio frequency (RF) identification (RFID) tag reader comprising: a head portion housing an imaging assembly, the imaging assembly configured to capture images of an environment appearing with a field of view (FOV) extending through a window; a base portion housing an RFID tag reader assembly; and an intermediate portion extending between the head portion and the base portion, wherein the RFID tag reader assembly includes a chassis having a face directed towards the FOV and an antenna assembly at least partially contoured around the face of the chassis, and wherein the antenna assembly includes: a monopole flexible antenna having a first monopole antenna element having a first half and a second half, the first half and the second half being substantially symmetrical about a line of symmetry; and a dipole flexible antenna extending at least partially over at least a portion of the first monopole antenna element.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
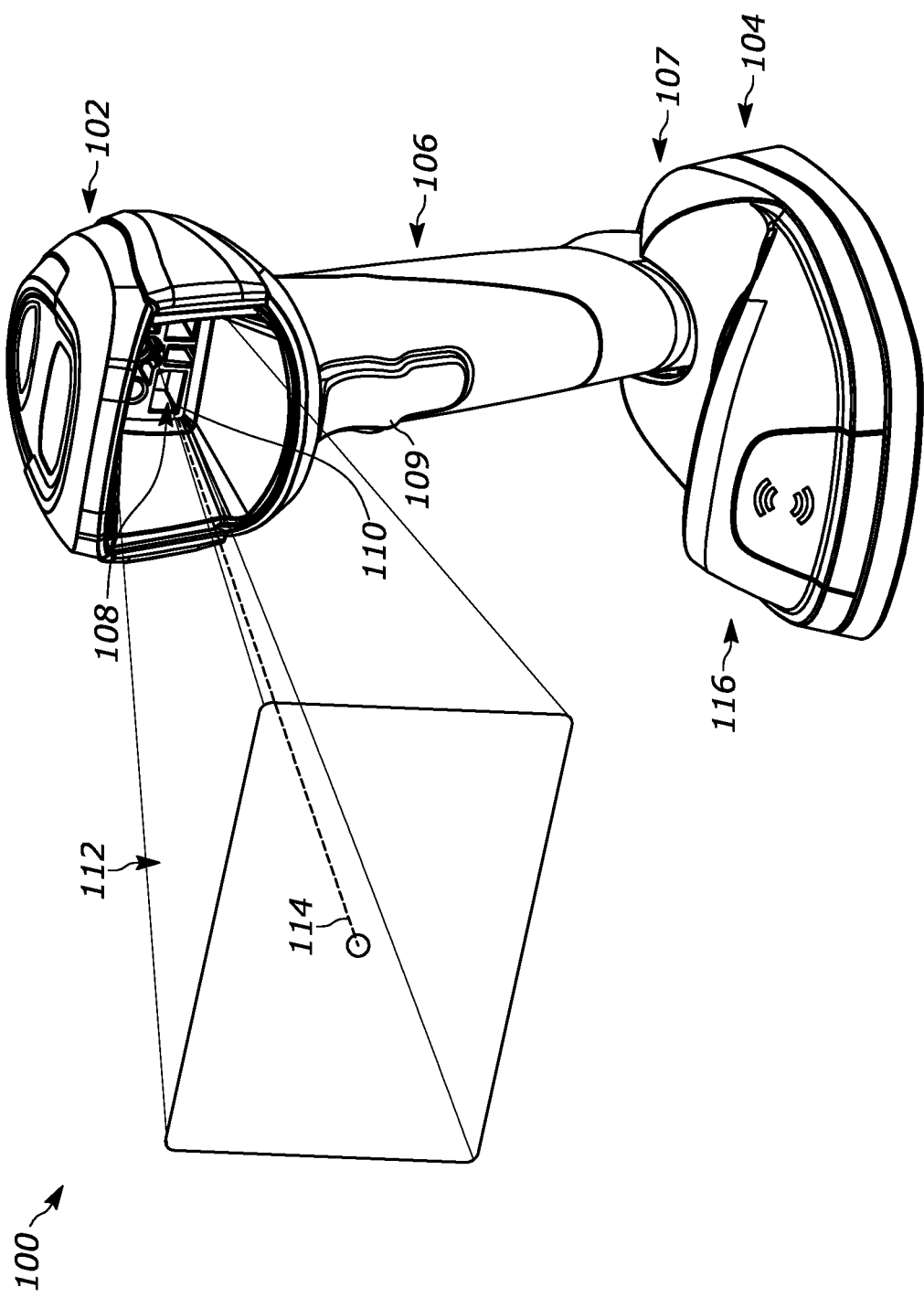
FIG. 1 illustrates a perspective view of an example barcode/RFID tag reading device in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring now to FIG. 1, illustrated therein is a perspective view of an example barcode/RFID tag reader 100 in accordance with various embodiments disclosed herein. The reader 100 includes a head portion 102, a base portion 104, and an intermediate portion 106 extending between the head portion 102 and the base portion 104. The head portion houses an imaging assembly 108 positioned behind a window 110. The imaging assembly 108 may include an image sensor (e.g., image sensor 118 of FIG. 2) that may include a plurality of photo-sensitive elements. The photo-sensitive elements may be arranged in a pattern and may form a substantially flat surface. For example, the photo-sensitive elements may be arranged in a grid or a series of arrays forming a 2D surface. In working form, the image sensor of the imaging assembly 108 is configured to capture images of an environment appearing within a field of view (FOV) 112 of the imaging assembly 108. For an imaging assembly having a 2D imaging sensor, the FOV 112 generally extends along an imaging axis 114 that, in some embodiments, extends from a central point of and is normal to the substantially flat surface of image sensor.

Figure 2:
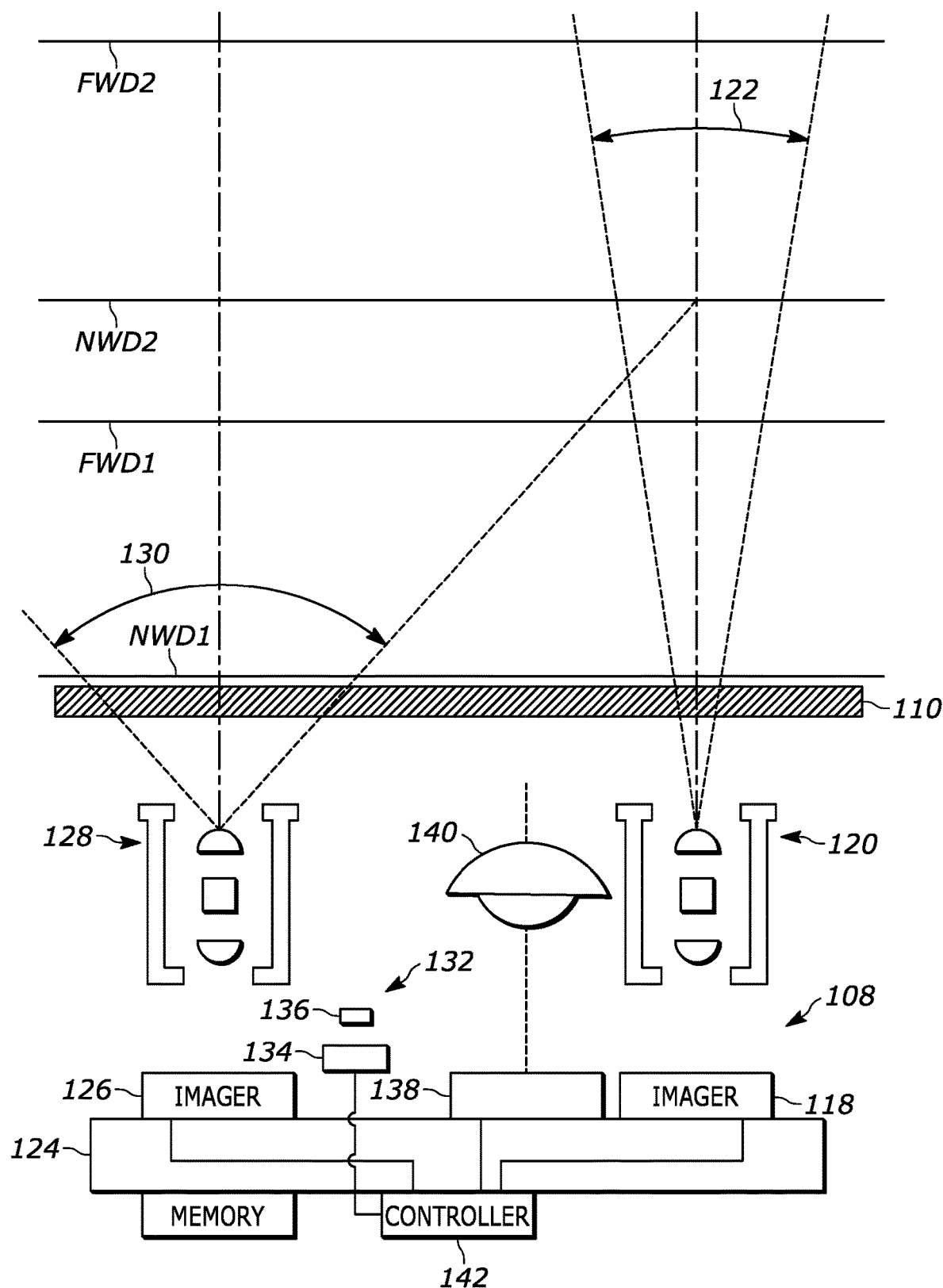
FIG. 2 illustrates a schematic, top-down view of an exemplary imaging assembly of the barcode/RFID tag reading device of FIG. 1.

As illustrated in greater detail in FIG. 2, the imaging assembly 108 may include a first image sensor 118 configured to work with a first lens assembly to capture images over a first FOV 122. The imager 118 is positioned on a printed circuit board (PCB) 124 which may act as a director and/or indirect support for any and/or all components of the imaging assembly 108. The imaging assembly 108 may further include a second image sensor 126 configured to work with a second lens assembly 128 to capture images over a second FOV 130. The first and second imagers may be configured, together with their respective lens assemblies, to capture images over varying fields of view where, for example, the first FOV 122 may be a relatively narrow FOV configured to provide readable image data from a far-out working distance ranging between FWD1 and FWD2, and the second FOV 130 may be a relatively wide FOV configured to provide readable image data from a close-in working distance ranging between NWD1 and NWD2. Additionally, the imaging assembly 108 may further include an aiming assembly 132 comprised of an aiming light source 134 and an aiming light lens 136, both configured to work together to provide an aiming pattern on a working plane indicative of some location associated with any one of the fields of view. Also, the imaging assembly 108 may further include an illumination assembly comprising an illumination light source 138 and an illumination light lens 140. The illumination light source 138 and the illumination light lens 140 are configured to work together to provide light to a target (e.g., a barcode) such that it is sufficiently illuminated for image capture purposes. Each of the first imager 118, second imager 126, aiming light source 134 and illumination light source 138 may be controlled via a controller 142 that is communicatively coupled to each of these components.

Returning to FIG. 1, the reader 100 also includes an RFID tag reader assembly 116 housed within the base portion 104. As will be described in greater detail later herein, the RFID tag reader assembly 116 includes multiple antenna elements arranged and configured to emit RF energy over a predefined area extending into, what may be referred to as, a product scanning region. It will be appreciated that in some embodiments, the product scanning region will be understood to refer to an area where an article may be positioned for presentation to the barcode and/or the RFID tag reader. Generally speaking, this area will be forward of the reader 100 and be in relatively close proximity to (and likely overlapping with) the FOV of the imaging assembly 108 and its working range.

In at least some preferred embodiments, the base portion 104 is configured to rest on a substantially flat surface (e.g., a table-top of a checkout counter/workstation) with the intermediate portion 106 being (in some embodiment removably) coupled to a rear section of the base portion 104. In some embodiments, the intermediate portion 106 is coupled to the base portion 104 in a coupling region 107 such that the intermediate portion 106 can pivot about the coupling region, allowing it to be positioned at a variety of angles relative to the base portion 104 and/or the surface on which the reader 100 rests.

Reader 100 further includes trigger 109. In some embodiments, trigger 109 may activate the imaging assembly 108 and the RFID tag reader 116 together for a reading session. In other embodiments, trigger 109 may be configured to activate, at least initially, one of the imaging assembly 108 or the RFID tag reader 116 where, for example, a top portion of trigger 109 activates the imaging assembly 108 and a bottom portion of trigger 109 activates the RFID tag reader 116, or vice versa. It is to be understood however, that activation of the imaging assembly 108 and/or the RFID tag reader 116 need not occur solely through trigger 109, and that reader 100 may also operate in a "hands-free" mode where activation of the imaging assembly 108 and/or the RFID tag reader 116 may occur upon the detection of products in the vicinity, field of view, effective reading range, etc. of reader 100.

Accordingly, with the imaging assembly 108 and the RFID tag reader 116, reader 100 is operable to provide 1D and/or 2D bar code reading and RFID tag reading and transfer, and is further operable to provide a flexible hands-free or hand-held design. Reader 100 may accommodate both counter-top and hand-held use.

In various embodiments, activation of the imaging assembly 108, e.g., via trigger 109, may cause the imaging assembly 108 to capture image data or information. Such image data or information may include, for example, product codes (e.g., barcodes or QR codes) associated with corresponding articles. In other embodiments, the data or information may include signature information or data.

Similarly, activation of the RFID rag reader 116, e.g., via trigger 109, may cause the RFID rag reader 116 to capture tag data or other such information. Such tag data or other information may be encoded, for example, on one or more RFID tags associated with one or more corresponding articles.

The data or information captured from either the optical imaging assembly 108 and/or the RFID tag reader 116 may be transmitted to point of sale (POS) stations, servers, or other processing devices for a variety of purposes including, e.g., product purchases, data storage, inventory purposes, etc. reader 100 includes a cabling interface for transmission of such data or information. In various embodiments, scanning device may support several data transmission interfaces including, for example, USB, Standard RS-232, IBM 468X/469X, Simple Serial Interface (SSI), or other data transmission interfaces standards.

Figure 3:
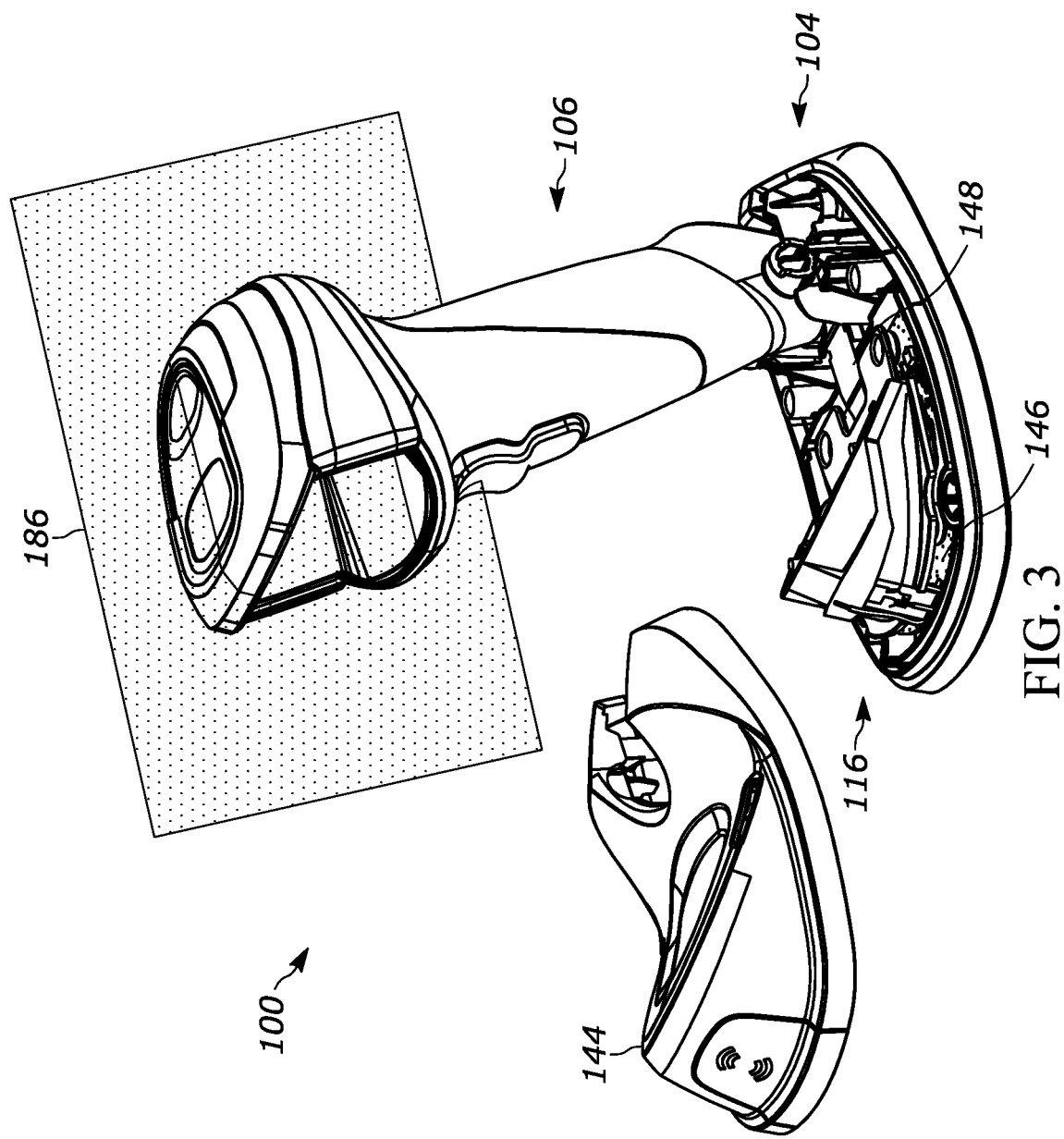
FIG. 3 illustrates a partially exploded view of the barcode/RFID tag reading device of FIG. 1.

Referring now to FIG. 3, shown therein is a partially exploded view of the reader 100 with the top cover 144 of the base portion 104 removed. Housed within the base portion 104 is the RFID tag reader assembly 116 positioned above a horizontally oriented printed circuit board (PCB) 146 extending along a portion of the lower section of the base portion 104. The PCB 146 may include circuitry necessary to drive the RFID tag reader assembly 116 and to at least partially process signals received by the RFID tag reader assembly 116. As illustrated, it is connected to additional reader 100 componentry via a ribbon cable 148 that extends below and/or into the intermediate portion 106 of the reader 100.

Figure 4:
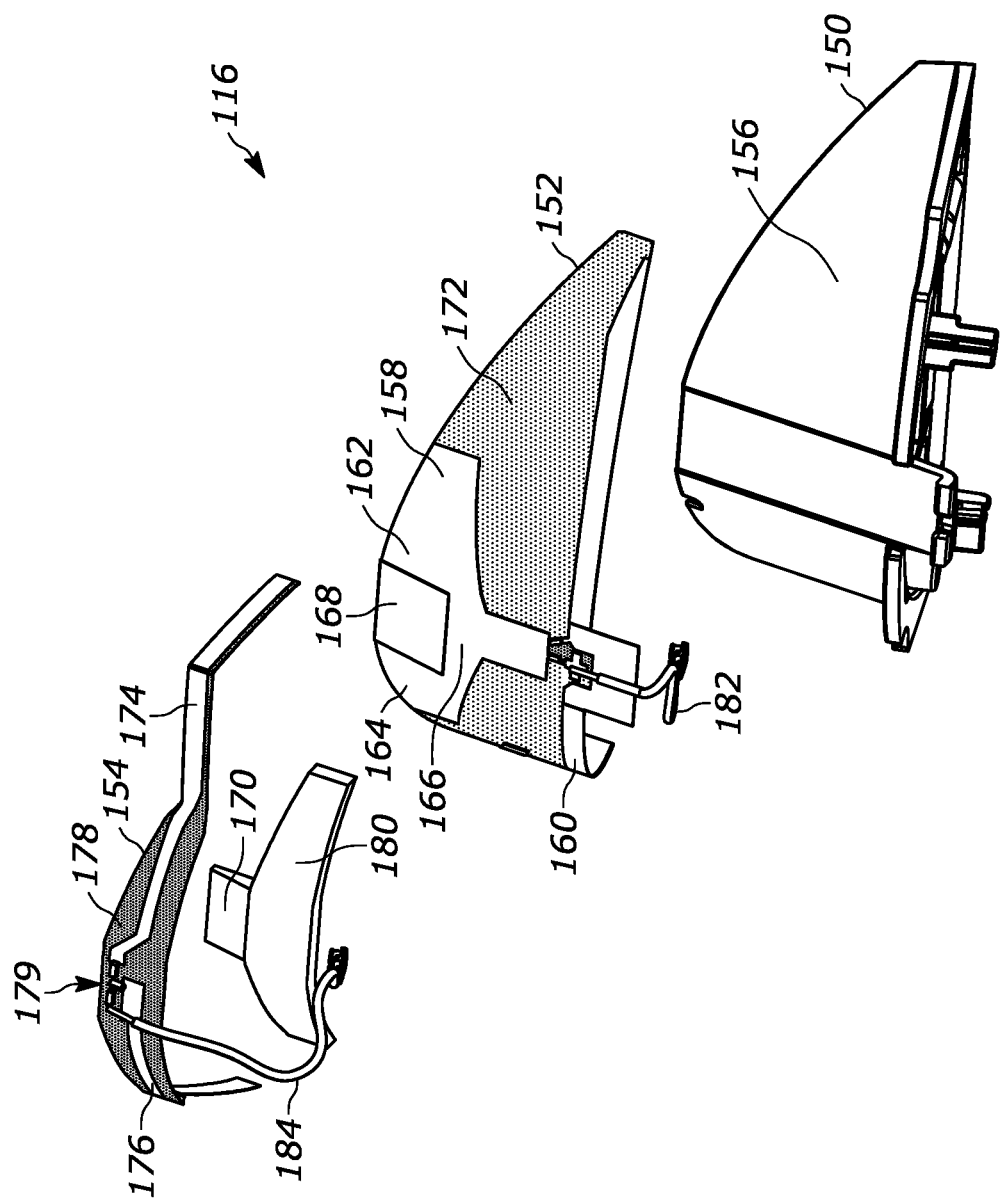
FIG. 4 illustrates an exploded perspective view of an exemplary RFID tag reader assembly of the barcode/RFID tag reading device of FIG. 1.
Figure 5:
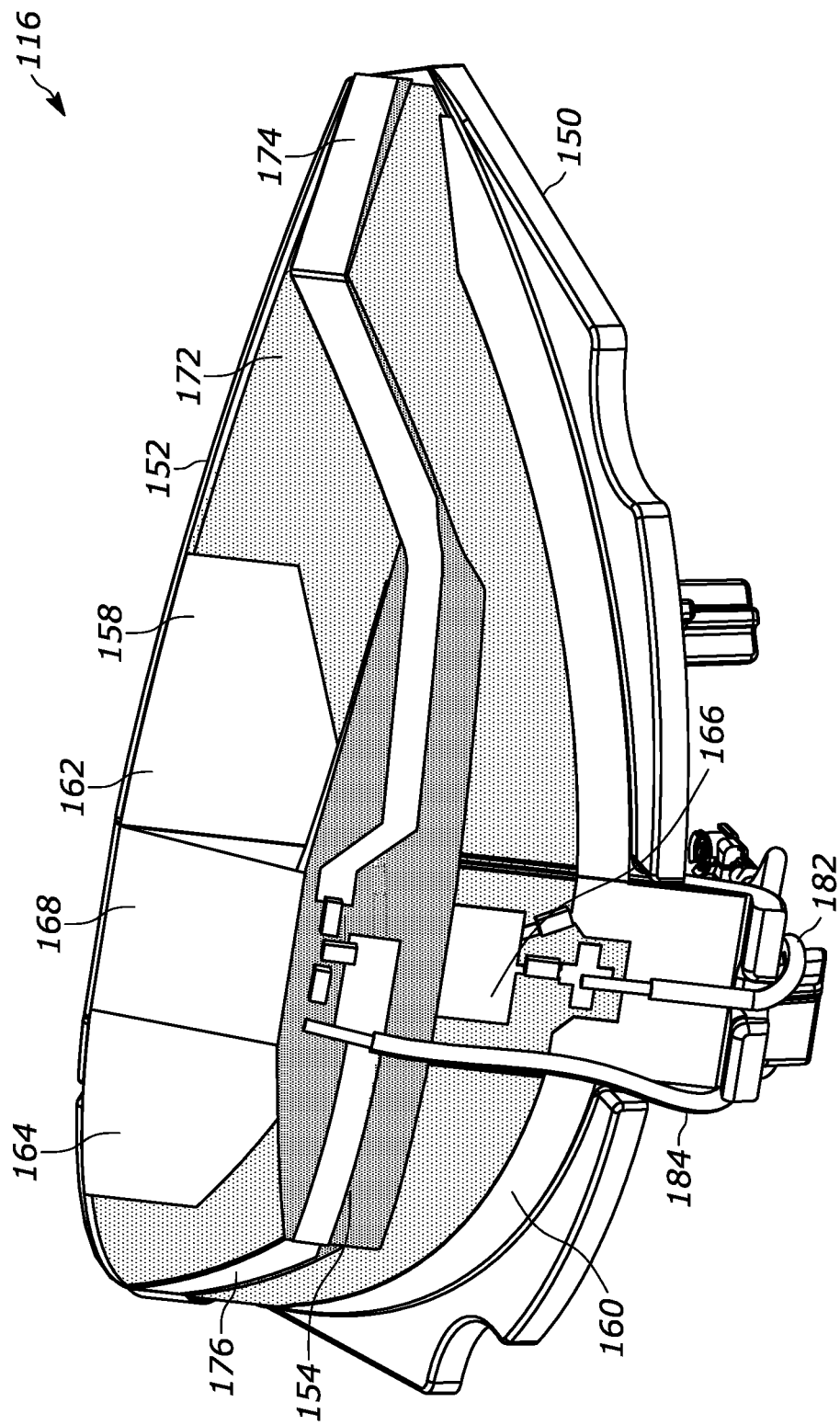
FIG. 5 illustrates a perspective view of the RFID tag reader assembly illustrated in FIG. 4.
Figure 6:
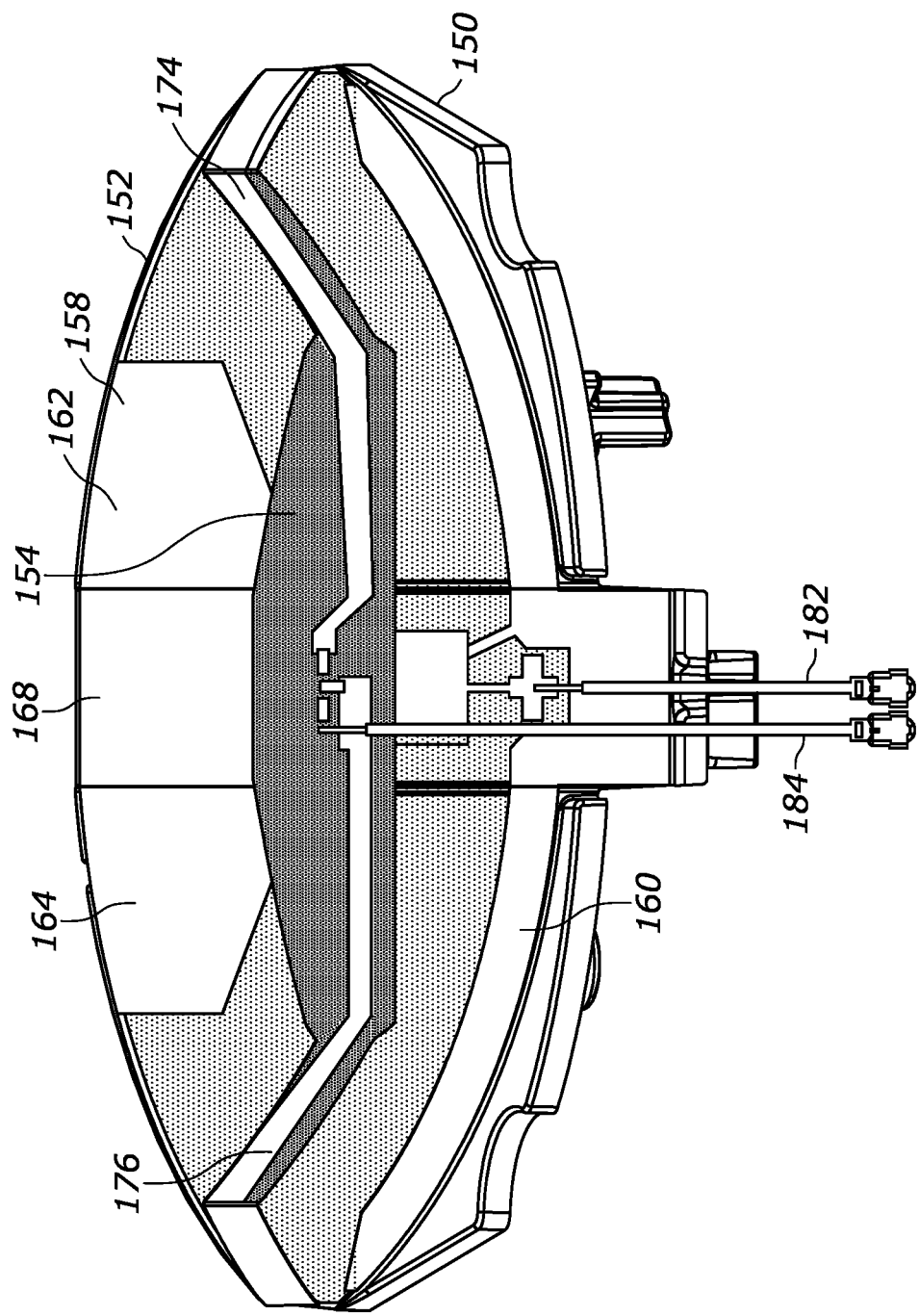
FIG. 6 illustrates a front view of the RFID tag reader assembly illustrated in FIG. 4.

As shown in FIGS. 4-6, the RFID tag reader assembly 116 includes a chassis 150, and an antenna assembly comprised of a monopole flexible antenna 152 and a dipole flexible antenna 154. Both the monopole flexible antenna 152 and the dipole flexible antenna 154 are positioned (in this case it may be said they are contoured) over a face 156 of the chassis 150. As can be gathered from FIG. 3, when the RFID tag reader assembly 116 is mounted in the reader 100, the face 156 of the chassis 150 is generally directed towards the FOV of the imaging assembly 108. This configuration can be achieved by (i) obliquely angling the face 156 backwards relative to a vertical axis that would be normal to a surface on which the reader 100 is configured to rest, (ii) obliquely angling the imaging axis 114 downwards relative to a horizontal axis that would be parallel to a surface on which the reader 100 is configured to rest, (iii) or a combination of (i) and (ii).

Best seen in FIG. 4, the monopole flexible antenna 152 has a first monopole antenna element 158 and a second monopole antenna element 160. In at least some preferred embodiments, the first monopole antenna element 158 is a radiator and is positioned near the upper portion of the face 156 of the chassis 150, and the second monopole antenna element 160 is a ground reference and is positioned near the lower portion of the face 156 of the chassis 150. In embodiments where the first monopole antenna element 158 exhibits certain level of symmetry, it can be logically divided into two halves (in this case a first half 162 and a second half 164) about the line of symmetry or about the central longitudinal plane as defined further herein. The currently illustrated design of the first monopole antenna element 158 can be said to have a winged shape as it includes wing-shaped elements extending to each side from a central region 166. To allow it to function as a radiator, the first monopole antenna element 158 can be made of any conductive material such as, for example, aluminum. Additionally, the first monopole antenna element 158 is preferably thin enough to allow for some level of elasticity that allows non-plastic deformation.

In some embodiments, the first monopole antenna element 158 includes a flap 168 which is folded over at least some portion of the rest of the first monopole antenna element. Such implementation allows for the first monopole antenna element 158 to have a relatively larger conductive area without the flap section 168 occupying additional space within the plane defined but the rest of the first monopole antenna element. In the illustrated example, the flap 168 is formed by a section of the first monopole antenna element 158 that is folded along the top region and positioned over a section of the central region 166. In at least some preferred embodiments, the flap 168 is separated from the region of the first monopole antenna element 158 over which it is folded over by a dielectric substrate like, for example, dielectric foam pad 170.

In addition to the first monopole antenna element 158, the monopole flexible antenna 152 also includes the second monopole antenna element 160. In the embodiment where the first monopole antenna element 158 is configured to be the radiator, the second monopole antenna element 160 is configured to be a ground reference. The second monopole antenna element 160 can be constructed in a manner that is same or similar to the first monopole antenna element 158. In the embodiment illustrated, the second monopole antenna element 160 is formed by an elongated trace that is positioned near the lower portion of the chassis 150.

To maintain an appropriate physical relationship between the first monopole antenna element 158 and the second monopole antenna element 160, webbing 172 is provided therebetween. Such webbing can be formed of any suitable dielectric material that allows for the positioning of the antenna elements thereon and provides a flexible substrate that can be contoured around the face 156 of the chassis 150.

Further to the monopole flexible antenna 152, the antenna assembly also includes a dipole flexible antenna 154. The dipole flexible antenna 154 is comprised of two a first dipole antenna element 174 and a second dipole antenna element 176 each of which is configured to be a radiator. As shown, preferably, the first dipole antenna element 174 and the second dipole antenna element 176 are positioned substantially symmetrically with respect to each other and can be made in a manner similar to elements of the monopole flexible antenna 152. That is, each of the first dipole antenna element 174 and the second dipole antenna element 176 can be made of any conductive material such as, for example, aluminum, that is preferably thin enough to allow for some level of elasticity that allows non-plastic deformation. Additionally, to maintain an appropriate physical relationship between the first dipole antenna element 174 and the second dipole antenna element 176, webbing 178 is provided therebetween. Such webbing can be formed of any suitable dielectric material that allows for the positioning of the antenna elements thereon and provides a flexible substrate that can be contoured around the face 156 of the chassis 150.

In at least some preferred embodiments, when the monopole flexible antenna 152 and the dipole flexible antenna 154 are installed in their respective positions relative to the chassis 150 and the chassis face 156, the dipole flexible antenna 154 extends at least partially over at least a portion of the monopole flexible antenna 152. In the illustrated embodiment, the overlap (best visible in FIGS. 5 and 6) occurs over the central region 166 of the first monopole antenna element 158 where a respective part of each of the first dipole antenna element 174 and the second dipole antenna element 176 overlays some part of said region. To maintain symmetry and a preferred electrical relationship between the monopole flexible antenna 152 and the dipole flexible antenna 154, the first dipole antenna element 174 is laid out to extend at least partially over at least a portion of the first half 162 and the second dipole antenna element 176 is laid out to extend at least partially over at least a portion of the first half 164. To avoid short-circuiting and provide isolation between the monopole flexible antenna 152 and the dipole flexible antenna 154 in the overlapping region, a dielectric substrate like, for example, dielectric foam pad 180 is positioned therebetween. In some cases (as illustrated) the foam pad 170 and the foam pad 180 can be a unitary substrate.

Each of the monopole flexible antenna 152 and the dipole flexible antenna 154 are electrically fed via respective cables 182, 184 which at one end attached to the rigid PCB 146 and at the other end attach directly or indirectly to the radiating elements of the monopole flexible antenna 152 and the dipole flexible antenna 154. In at least some preferred embodiments, the respective electrical feed points for each of the monopole flexible antenna 152 elements and the dipole flexible antenna 154 elements are located near a central longitudinal plane of the reader 100. In some embodiments, the central longitudinal plane may be defined as the plane 186 about which the head portion 102 exhibits substantial symmetry. While in some embodiments, the respective electrical feed points for each of the monopole flexible antenna 152 elements and the dipole flexible antenna 154 elements are positioned on opposite sides of the central longitudinal plane, in other embodiments these feed points can be positioned on the same side of the central longitudinal plane. Still, in other embodiments it is possible to have the feed points differ with respect to their placement relative to central longitudinal plane. In other words, while one of the monopole flexible antenna 152 and the dipole flexible antenna 154 may have its antenna elements fed via connections on the same side of the central longitudinal plane, the other of the monopole flexible antenna 152 and the dipole flexible antenna 154 may have its antenna elements fed via connections on opposite sides of the central longitudinal plane. In at least some preferred embodiments, the connection points for each antenna element is within 15 mm of the central longitudinal plane.

To achieve electromagnetic performance desired in some embodiments, certain physical constraints may be implemented with respect to the antennae arrangements. For example, in some embodiments the first dipole antenna element 174 may be implemented as a conductive trace having a width and a length where the length is at least three times greater than the width of said trace. It should be understood that references to a trace length and a trace width will be apparent to those of ordinary skill. However, in at least some cases the trace length can be interpreted as the electrical distance from one end of the trace to the other end of the trace, and the trace width can be interpreted as a width of the trace at any point along the trace length. Accordingly, in the example of the first dipole antenna element 174, the trace length would be measured from the feed point of the trace to the opposite end of the trace located towards the rear of the dipole flexible antenna 154. Similarly, the second dipole antenna element 176 may also be implemented as a conductive trace having a width and a length where the length is at least three times greater than the width of said trace.

While in some implementations the trace length may be expressed relative to the trace width, in some embodiments the trace length may be based on the expected operational radio frequency range of the RFID tag reader assembly 116. Thus, in some embodiment the total length of the conductive trace of the first dipole antenna element 174 and the conductive trace of the second dipole antenna element 176 may be configured as having a length that is less than or equal to half-wavelength of any wavelength within the predetermined operational radio frequency range of the RFID tag reader assembly 116. In some embodiments, the total length is less than or equal to one third of any wavelength within the predetermined operational radio frequency range of the RFID tag reader assembly 116. In some embodiments, the total length is less than or equal to three eighths of any wavelength within the predetermined operational radio frequency range of the RFID tag reader assembly 116. In some embodiments, to achieve appropriate resonance of the traces at the predetermined operational radio frequencies, tuning components 179 (e.g., resistor(s), inductor(s), capacitor(s), etc.) are implemented. These tuning components 179 may be implemented on either one or both of the monopole flexible antenna 152 and the dipole flexible antenna 154, and may be positioned between the respective traces of each antenna. Thus, for example, when operating in the RFID frequency range at 928 MHz, the wavelength is approximately 323 mm. Consequently, when operating in this frequency range, the dipole flexible antenna 154 may be configured to have a total length of less than or equal approximately to 161 mm (i.e., less than or equal to half the wavelength), less than or equal approximately to 121 mm (i.e., less than or equal to three eighths the wavelength), less than or equal approximately to 107 mm (i.e., less than or equal to one third the wavelength), or any other desirable length. It should be understood that the length measurement noted above may be inclusive of any tuning components.

To allow for improved functionality and enable the RFID tag reader assembly 116 to read RFID tags oriented in a variety of directions/orientations relative to the reader 100, it is preferable to have the monopole flexible antenna 152 and the dipole flexible antenna 154 emit differently polarized RF energy. For example, while the monopole flexible antenna can be configured to emit vertically polarized RF radiation, the dipole flexible antenna may be configured to emit horizontally polarized RF radiation. In other examples, those polarization configurations may be switches. In still other examples, other types of polarizations (e.g., linear, circular, horizontal, vertical, left hand circular, right hand circular, theta, and phi) may be used.

It will be appreciated that aforementioned embodiments can be particularly advantageous as they can reduce the complexity of the RFID tag reader assembly 116, leading to reduced cost and/or improved reliability. This can be achieved, in part, by avoiding the use of any rigid PCBs with the construction of the RFID tag reader assembly 116, relying, instead, on flexible substrates and antenna elements.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A barcode and radio frequency (RF) identification (RFID) tag reader comprising:
    a head portion housing an imaging assembly, the imaging assembly configured to capture images of an environment appearing with a field of view (FOV) extending through a window;
    a base portion housing an RFID tag reader assembly; and
    an intermediate portion extending between the head portion and the base portion,
    wherein the RFID tag reader assembly includes a chassis having a face directed towards the FOV and an antenna assembly at least partially contoured around the face of the chassis, and
    wherein the antenna assembly includes:
        a monopole flexible antenna having a first monopole antenna element positioned near a top portion of the face of the chassis and a second monopole antenna element positioned near a bottom portion of the face of the chassis; and
        a dipole flexible antenna extending at least partially over at least a portion of the first monopole antenna element.

2. The barcode and RFID tag reader of claim 1, wherein the head portion is substantially symmetrical about a central longitudinal plane, wherein the dipole flexible antenna includes a first dipole antenna element and a second dipole antenna element, and wherein each of the first dipole antenna element and the second dipole antenna element includes a respective feed point positioned near the central longitudinal plane.

3. The barcode and RFID tag reader of claim 2, wherein the respective feed point of the first dipole antenna element is positioned on a first side of the central longitudinal plane and the respective feed point of the second dipole antenna element is positioned on a second side of the central longitudinal plane.

4. The barcode and RFID tag reader of claim 2, wherein the each of the respective feed point of the first dipole antenna element and the respective feed point of the second dipole antenna element is positioned within 15 mm of the central longitudinal plane.

5. The barcode and RFID tag reader of claim 1, wherein:
    the first monopole antenna element has a first half and a second half, the first half being substantially symmetrical about a longitudinal centerline of the first monopole antenna element;
    the dipole flexible antenna includes a first dipole antenna element and a second dipole antenna element;
    the first dipole antenna element extends at least partially over at least a portion of the first half; and
    the second dipole antenna element extends at least partially over at least a portion of the second half.

6. The barcode and RFID tag reader of claim 5, wherein the first monopole antenna element further includes a flap section, the flap section being folded over a central portion of the first monopole antenna element.

7. The barcode and RFID tag reader of claim 5, wherein the first monopole antenna element has a substantially winged shape.

8. The barcode and RFID tag reader of claim 1, wherein the first dipole antenna element includes a first conductive trace having a respective feed point at one end and a respective open circuit at an opposite end, the first conductive trace further having a first conductive trace width and a first conductive trace length that is at least three times greater than the first conductive trace width.

9. The barcode and RFID tag reader of claim 8,
    wherein the head portion is substantially symmetrical about a central longitudinal plane,
    wherein the second dipole antenna element includes a second conductive trace having a respective feed point at one end and a respective open circuit at an opposite end, the second conductive trace further having a second conductive trace width and a second conductive trace length that is at least three times greater than the second conductive trace width, and
    wherein the first conductive trace and the second conductive trace are positioned substantially symmetrically about the central longitudinal plane.

10. The barcode and RFID tag reader of claim 1, wherein the second monopole antenna element is configured to act as a ground reference.

11. The barcode and RFID tag reader of claim 1, wherein the chassis of the RFID tag reader assembly is positioned within the base portion above a horizontal printed circuit board (PCB), and wherein the horizontal PCB is connected to each of the monopole flexible antenna and the dipole flexible antenna via a respective cable.

12. The barcode and RFID tag reader of claim 1, wherein the antenna assembly does not include a rigid printed circuit board.

13. The barcode and RFID tag reader of claim 1, wherein the monopole flexible antenna is configured to emit vertically polarized RF radiation, and wherein the dipole flexible antenna is configured to emit horizontally polarized RF radiation.

14. The barcode and RFID tag reader of claim 1, wherein the RFID tag reader assembly is configured to operate within a predetermined radio frequency range,
wherein the dipole flexible antenna includes an electrical circuit having a plurality of conductive traces, and
wherein a length of the electrical circuit is less than or equal to half-wavelength of any wavelength within the predetermined radio frequency range.

15. The barcode and RFID tag reader of claim 14, wherein the length of the electrical circuit is less than or equal to three eighth of the any wavelength within the predetermined radio frequency range.

16. The barcode and RFID tag reader of claim 14, wherein the length of the electrical circuit is less than half-wavelength of the any wavelength within the predetermined radio frequency range, and
wherein the electrical circuit includes at least one tuning component configured to cause the dipole flexible antenna to resonate within the predetermined radio frequency range.

17. A barcode and radio frequency (RF) identification (RFID) tag reader comprising:
a head portion housing an imaging assembly, the imaging assembly configured to capture images of an environment appearing with a field of view (FOV) extending through a window;
a base portion housing an RFID tag reader assembly; and
an intermediate portion extending between the head portion and the base portion,
wherein the RFID tag reader assembly includes a chassis having a face directed towards the FOV and an antenna assembly at least partially contoured around the face of the chassis, and
wherein the antenna assembly includes:
a monopole flexible antenna having a first monopole antenna element having a first half and a second half, the first half and the second half being substantially symmetrical about a line of symmetry; and
a dipole flexible antenna extending at least partially over at least a portion of the first monopole antenna element.

18. The barcode and RFID tag reader of claim 17, wherein the dipole flexible antenna includes a first dipole antenna element and a second dipole antenna element, wherein the first dipole antenna element extends at least partially over at least a portion of the first half, and wherein the second dipole antenna element extends at least partially over at least a portion of the second half.

19. The barcode and RFID tag reader of claim 17, wherein the first monopole antenna element further includes a flap section, the flap section being folded over a central portion of the first monopole antenna element.

20. The barcode and RFID tag reader of claim 17, wherein the first monopole antenna element has a substantially winged shape.

21. The barcode and RFID tag reader of claim 17, wherein the antenna assembly does not include a rigid printed circuit board.

22. The barcode and RFID tag reader of claim 17, wherein the RFID tag reader assembly is configured to operate within a predetermined radio frequency range,
wherein the dipole flexible antenna includes an electrical circuit having a plurality of conductive traces, and
wherein a length of the electrical circuit is less than or equal to half-wavelength of any wavelength within the predetermined radio frequency range.

23. The barcode and RFID tag reader of claim 22, wherein the length of the electrical circuit is less than or equal to three eighth of the any wavelength within the predetermined radio frequency range.

* * * * *